(12) United States Patent
Kamath

(10) Patent No.: US 8,643,340 B1
(45) Date of Patent: Feb. 4, 2014

(54) POWERING A CIRCUIT BY ALTERNATING POWER SUPPLY CONNECTIONS IN SERIES AND PARALLEL WITH A STORAGE CAPACITOR

(75) Inventor: Gautham Devendra Kamath, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 827 days.

(21) Appl. No.: 12/569,549

(22) Filed: Sep. 29, 2009

(51) Int. Cl.
*H02J 7/00* (2006.01)

(52) U.S. Cl.
USPC ............ 320/138; 320/166; 320/107; 326/115; 257/499

(58) Field of Classification Search
USPC .......................................................... 320/138
See application file for complete search history.

(56) References Cited

U.S. PATENT DOCUMENTS

| 5,442,317 | A | 8/1995 | Stengel | |
|---|---|---|---|---|
| 5,461,297 | A * | 10/1995 | Crawford | 320/166 |
| 6,586,992 | B1 | 7/2003 | Strakovsky | |
| 7,113,006 | B2 * | 9/2006 | Hsu et al. | 327/77 |
| 7,482,785 | B2 * | 1/2009 | Kaiser | 320/166 |
| 7,994,756 | B2 * | 8/2011 | Rowland | 320/166 |
| 2005/0050417 | A1 * | 3/2005 | Kamath | 714/726 |
| 2005/0068010 | A1 * | 3/2005 | Chen et al. | 323/210 |
| 2007/0133146 | A1 * | 6/2007 | Nerheim | 361/232 |
| 2007/0194759 | A1 * | 8/2007 | Shimizu et al. | 320/166 |
| 2008/0044041 | A1 * | 2/2008 | Tucker et al. | 381/120 |

FOREIGN PATENT DOCUMENTS

EP  2204905 A1  7/2010

OTHER PUBLICATIONS

Rajapandian, et al., "High-Voltage Power Delivery Through Charge Recycling", IEEE Journal of Solid-State Circuits, Jun. 2006, pp. 1400-1410, vol. 41, No. 6, Piscataway, NJ.

* cited by examiner

*Primary Examiner* — Yalkew Fantu
(74) *Attorney, Agent, or Firm* — Andrew Mitch Harris; Mitch Harris, Atty at Law, LLC

(57) ABSTRACT

An integrated circuit (IC) having an internal power supply voltage step down circuit provides efficiency while requiring a minimum of external terminals. In a first operating mode, a storage capacitor is charged from the power supply return of a group of circuits, while the group of circuits is powered from an input power supply voltage provided to the IC. In a second operating mode, the group of circuits is powered from the storage capacitor. The step-down circuit provides for halving the input power supply voltage, but multiple storage capacitors and additional operating modes can be provided for voltage division by greater factors. A sensing circuit can be employed to sense the voltage across the storage capacitor (s) and in response, select the operating mode, providing hysteretic control of the voltage supplied to the group of circuits.

21 Claims, 7 Drawing Sheets

POWERING A CIRCUIT BY ALTERNATING POWER SUPPLY CONNECTIONS IN SERIES AND PARALLEL WITH A STORAGE CAPACITOR

BACKGROUND OF THE INVENTION

1. Field of the Invention

The present invention relates generally to powering a circuit, and more specifically, to a method of powering a circuit by alternating the circuit power supply connections between in series with and in parallel with a storage capacitor.

2. Background of the Invention

Present day processors and other integrated circuits (ICs) operating at low power supply voltages typically include an internal voltage step-down circuit, or employ a local external voltage regulator module (VRM) to reduce the voltage distributed to the IC. The IC may, for example, use the power supply voltage provided to the IC for some circuits, such as clock synthesizers, while circuits such as VLSI (very large scale integration) core, are operated from a voltage that is half or less than that of the power supplies distributed through a system including the IC.

The use of external VRMs is costly and therefore an internal solution is desirable. A typical internal solution employed in some such ICs is either a linear regulator that lowers the power supply voltage, which increases power dissipation in the IC and wastes power, or an arrangement such as a capacitive voltage divider. A capacitive voltage divider can be reasonably efficient, but the flying capacitor used in the voltage divider requires two terminals of the IC, with an additional terminal required for filtering the output of the voltage divider circuit. The size of the capacitor typically required for a voltage divider having the generally necessary current output is prohibitive for inclusion in an IC. Therefore, the three extra terminals are typically required when an internal capacitive voltage divider is used to reduce the input power supply voltage in an IC.

Another solution that has been used, is an integrated switching power converter using an external inductor and capacitor. Such a converter requires only one extra IC terminal in addition to the filter capacitor terminal. However, an external inductor is typically required, which is typically expensive, bulky and is a source of EMI (electro-magnetic interference).

One additional solution that has been proposed, divides the circuits within an IC into two groups, which are then powered in a series power supply connection, with a linear shunt current regulator provided in parallel with each of the groups of circuits. By continuously balancing the average current of each of the circuit group/shunt regulator parallel combinations, the midpoint between the two series-connected circuit groups can be maintained at half of the power supply voltage. The only power that is wasted is any shunt current required to balance the currents consumed by the two groups of circuits, multiplied by half of the power supply voltage.

However, it is generally difficult to partition an IC into two groups of circuits with equal power consumption. Also, some circuits are not amenable to such division, since the two separate circuit groups will require level translation in order to communicate between the circuit groups. Level translation consumes circuit area and adds power consumption, so any signals that are connected between the circuit groups increase the area requirements and power consumption. Further, even when such an IC can be partitioned, the balance of current consumption will generally not be the same for all operating modes and/or states of an IC. Finally, when the circuit groups are digital, having two separate digital routes adds interconnect area and increases the delays through the associated signal paths.

Therefore, it would be desirable to provide a method and apparatus for reducing the power supply voltage provided to an IC and powering a group of circuits within the IC, such that high efficiency and low power dissipation are maintained using few external terminals of the IC and a minimum number of external discrete components. It would further be desirable to provide such an IC, in which circuit real estate, complexity and EMI performance are also not substantially compromised by the inclusion of the apparatus.

SUMMARY OF THE INVENTION

The above stated objectives of internally reducing a power supply voltage provided to an integrated circuit to power a group of internal circuits while maintaining high efficiency, low power dissipation, using few external terminals are accomplished in an integrated circuit and its method of operation.

The integrated circuit includes a switching circuit and a control circuit that alternatively connect a power supply input and a corresponding power supply return of a group of circuits within the IC in series with a storage capacitor in a first operating mode, and then in parallel with the storage capacitor in a second operating mode. In the first operating mode, the switching circuit causes the power supply path of the group of circuits to charge the storage capacitor from a power supply voltage provided to the integrated circuit. In the second operating mode, the switching circuit connects the power supply path of the group of circuits across the storage capacitor, disconnecting the power supply voltage provided to the integrated circuit. The storage capacitor is generally an external storage capacitor, requiring only one additional terminal for connecting the capacitor, but an internal capacitor could alternatively be provided in some configurations, eliminating the need for an extra external terminal.

The control circuit may detect the voltage across the storage capacitor and change the operating mode from the first operating mode to the second operating mode when the voltage across the storage capacitor reaches a first threshold voltage, e.g. half of the power supply voltage plus some hysteresis. Then the control circuit may select the first operating mode again once the voltage across the storage capacitor drops by twice the hysteresis value. Multiple capacitors can be used in alternative configurations that provide, for example, a power supply voltage that is one-third of the power supply voltage input using two external capacitors, and so forth.

The foregoing and other objectives, features, and advantages of the invention will be apparent from the following, more particular, description of the preferred embodiment of the invention, as illustrated in the accompanying drawings.

DESCRIPTION OF ILLUSTRATIVE EMBODIMENT

The present invention encompasses a method and apparatus that power a group of circuits within an integrated circuit (IC) by stepping down an input power supply voltage provided to the IC. Rather than generate a stepped-down power supply voltage and provide it to the group of circuits in a static fashion, in the present invention, the power supply path of the group of circuit is switched from a series connection with the input power supply voltage and a storage capacitor, charging the storage capacitor, to a parallel connection in which the storage capacitor is discharged to power the group of circuits. The resulting structure and operation eliminates the need for an external flying capacitor and the associated IC terminals in order to form a capacitive voltage divider. Multiple storage capacitors can be provided to divide the input power supply voltage by factors greater than two.

Figure 1A:
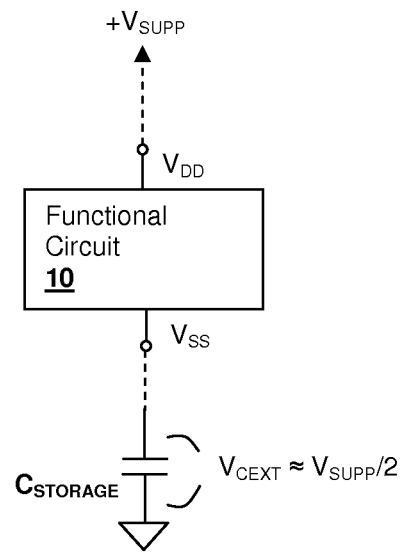
FIGS. 1A and 1B are simplified schematic diagrams depicting modes of operation of an integrated circuit in accordance with an embodiment of the present invention.
Figure 1B:
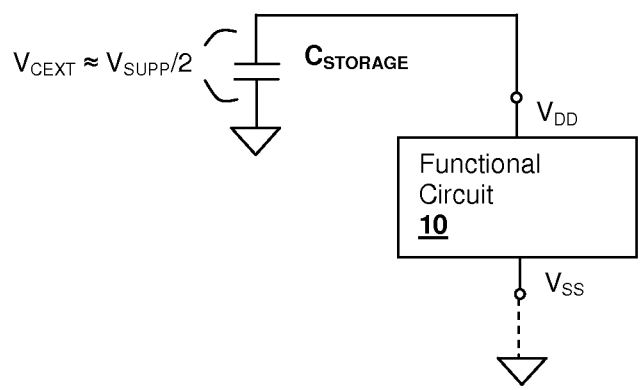

Referring now to FIG. 1A and FIG. 1B, modes of operation of a circuit in accordance with an embodiment of the present invention are shown. A functional circuit 10, is provided by a group of individual circuits, for example, functional circuit 10 may be a digital logic circuit containing a large number of logic gates, an analog circuit containing amplifiers, mixers and other analog components, or functional circuit may be a mixed-signal circuit containing multiple types of individual circuits. In a first mode of operation, as illustrated in FIG. 1A, functional circuit 10 is powered by series-connecting the power supply path (i.e., the pair of power supply rails $V_{DD}$ and $V_{SS}$) of functional circuit 10 between a power supply voltage source $+V_{SUPP}$ and an energy storage capacitor $C_{STORAGE}$, which has another terminal connected to the power supply return associated with power supply voltage source $+V_{SUPP}$ (ground in the illustrated embodiment). Such a configuration will generally power functional circuit 10 only for a short time until voltage $V_{CEXT}$ increases, thereby decreasing the voltage between power supply rails $V_{DD}$ and $V_{SS}$ to voltage such that operation of functional circuit 10 would be compromised.

Before voltage $V_{CEXT}$ has risen too high, operation of the illustrated circuit changes to a second operating mode, as illustrated in FIG. 1B. As illustrated in FIG. 1B, in the second operating mode, functional circuit 10 is powered by connecting the power supply path of functional circuit 10 in parallel across the terminals of energy storage capacitor $C_{STORAGE}$. Again, the second operating mode can only generally power functional circuit 10 for a short time, until voltage $V_{CEXT}$ has decreased such that the voltage between power supply rails $V_{DD}$ and $V_{SS}$ has reached another voltage such that operation of functional circuit 10 would be compromised. The time periods for which functional circuit 10 can be powered in each of the first and second operating modes are relative, in that for some very low power applications in which a power supply voltage must be stepped down anyway, e.g., when operating a low voltage circuit in a standby mode from a battery having a higher voltage, the time periods may be relatively long compared to, for example, operating a VLSI circuit that may consume an ampere or more during full operation. The capacitance of capacitor $C_{STORAGE}$, the current drawn by the power supply path of functional circuit 10 and the range of voltage swing allowable across the power supply path of functional circuit 10 determines the alternation frequency between the first and second operating modes of the illustrated circuit, according to $\Delta T = C^* \Delta V / I$, where C is the capacitance of storage capacitor $C_{STORAGE}$, I is the current through the power supply path of functional circuit 10 and $\Delta V$ is the change in voltage during the period each operating mode is selected. Assuming that power supply current I remains constant and the average of voltage $V_{CEXT}$ is to be maintained at half of the voltage of power supply voltage source $+V_{SUPP}$, the time periods of the first and second operating modes should be equal and a complete cycle of the powering scheme occurs in a time period $2\Delta T = C^* \Delta V / I$.

Figure 2:
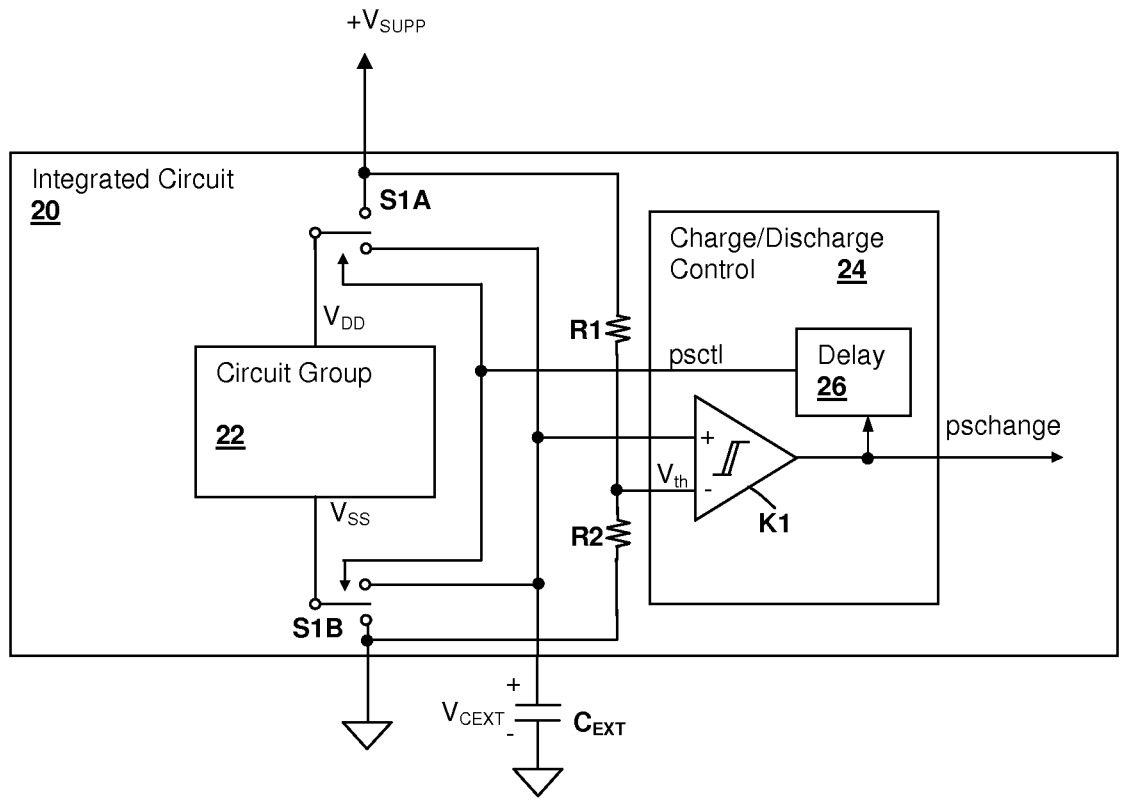
FIG. 2 is a block diagram depicting details of an integrated circuit 20 in accordance with an embodiment of the present invention.

Referring now to FIG. 2, an integrated circuit 20 in accordance with an embodiment of the invention is illustrated. Integrated circuit 20 includes a terminal for connection of an external storage capacitor $C_{EXT}$ that is used to alternatively be charged through a power path of circuit group 22 in a first operating mode, and to provide power to circuit group 22 in a second operating mode, that are selected by a switching circuit provided by switches S1A-S1B and a charge/discharge control circuit 24. Circuit group 22 may be, as described above for functional circuit 10 of FIGS. 1A-1B, a digital logic circuit, an analog circuit, or a mixed-signal circuit and contains a group of elemental circuits, such as logic gates or amplifiers.

Charge/discharge control circuit 24 compares a voltage $V_{CEXT}$ at the terminal connecting external storage capacitor $C_{EXT}$ to a mid-supply voltage derived by a voltage divider formed by resistors R1 and R2 using a hysteresis comparator K1. Resistors R1 and R2 are generally equal, since the depicted circuit generally operates most efficiently when the average voltage across storage capacitor $C_{EXT}$ is maintained at a voltage of $+V_{SUPP}/2$, or half of the input power supply voltage. Other circuit configurations for generating a voltage of one-third or other integer division of the input power supply voltage will be illustrated in further detail below. Since integrated circuit 20 has a single storage capacitor terminal and connected storage capacitor $C_{EXT}$, operation around the mid-supply point is desirable because the voltage swing across the common power supply rails of circuit group 22 ($V_{DD}$ and $V_{SS}$) will be approximately equal, providing the minimum peak power supply ripple over both operating modes across the common power supply rails of circuit group 22 ($V_{DD}$ and $V_{SS}$).

Comparator K1 generates a mode change output signal pschange which can be delayed by a delay circuit 26 to provide a mode change control signal psctl. Delay circuit 26 is optional and is only needed if an early indication that a mode changes will occur. Such an early indication is provided by mode change output signal pschange, which can be used to avoid performing operations during the transition between the first operating mode and the second operating mode of integrated circuit 20. For example, if circuit group 22 includes analog amplifiers, DC bias level of the amplifiers may change with the change of operating mode and therefore mode change output signal pschange can provide an indication that measurements be discarded, or amplifier outputs suppressed/held during the transition, depending on their particular functions.

Mode change control signal psctl controls selection of the positions of switches S1A-S1B as follows: in the first operating mode, when $V_{CEXT}$ is less than a threshold voltage $V_{th}$ plus a hysteresis voltage $V_{hyst}$, switches S1A-S1B are selected to their upper position in FIG. 2, thereby selecting a first operating mode, in which common power supply input $V_{DD}$ of circuit group 22 is coupled to the terminal connecting power supply voltage input $+V_{SUPP}$, and common power supply return $V_{SS}$ is coupled to the terminal that connects external storage capacitor $C_{EXT}$. When comparator K1 detects that voltage $V_{CEXT}$ is greater than threshold voltage $V_{th}$ plus a hysteresis voltage $V_{hyst}$, switches S1A-S1B are selected to their lower position in FIG. 2, thereby selecting the second operating mode, in which common power supply input $V_{DD}$ of circuit group 22 is coupled to the terminal that connects external storage capacitor $C_{EXT}$ and common power supply return $V_{SS}$ is coupled to ground, which is the power supply return corresponding to power supply voltage input $+V_{SUPP}$.

Figure 3:
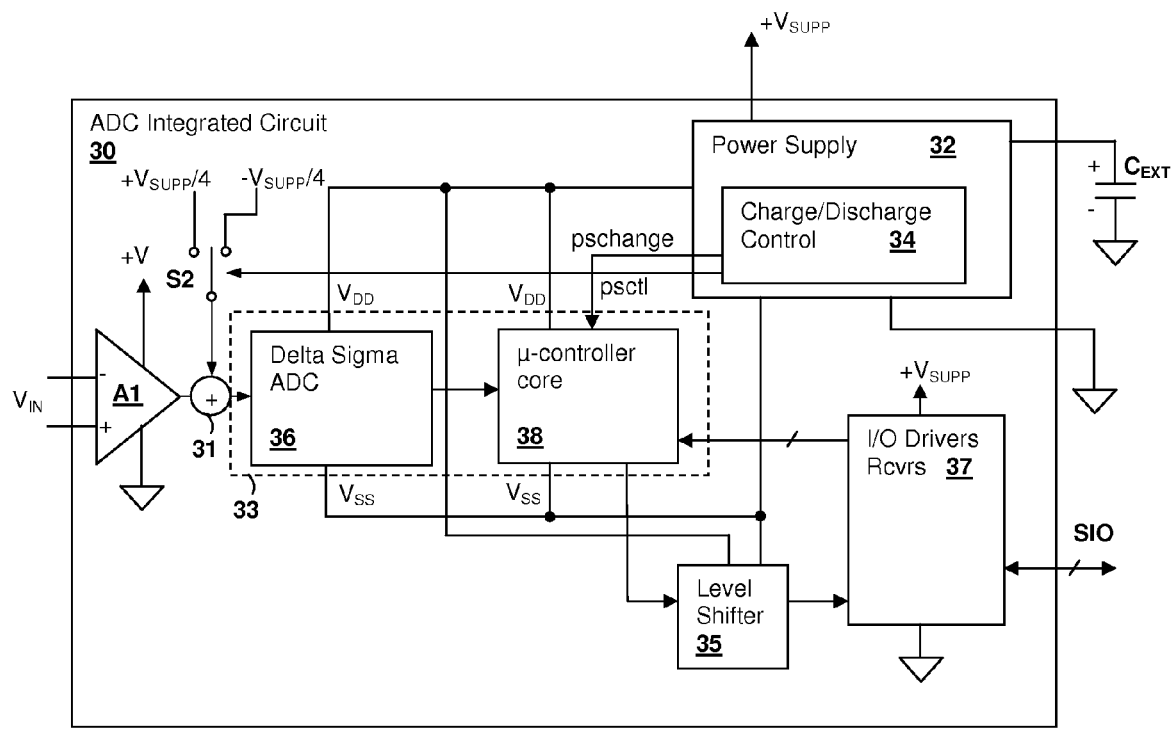
FIG. 3 is a block diagram depicting details of an analog-to-digital converter (ADC) integrated circuit 30 in accordance with an embodiment of the present invention.

Referring now to FIG. 3, an analog-to-digital converter (ADC) 30 is illustrated in accordance with an embodiment of the present invention. ADC 30 provides an example of a mixed-signal architecture in which the present invention is incorporated, and further illustrates additional features included for communication between circuit groups and circuits for interfacing with external devices that may be required when implementing a circuit according to the present invention. ADC 30 includes a power supply circuit 32 which includes a charge/discharge control circuit 34. Power supply circuit 32 can be implemented in a manner identical to that illustrated in FIG. 2 by switches S1A-S1B, resistors R1-R2 and charge/discharge control circuit 24 and may operate in a like manner. Therefore details of power supply circuit 32 have been omitted for clarity of illustration of the remaining features of ADC 30.

A terminal is provided for connection of external storage capacitor $C_{EXT}$ to power supply circuit 32, which provides connection to the common power supply rail $V_{DD}$ and corresponding common power supply return $V_{SS}$ of a delta-sigma ADC circuit 36 and a microcontroller core 38 that processes the outputs of delta-sigma ADC circuit 36. Both ADC circuit 36 and microcontroller core 38 are powered in a manner as described above with reference to FIGS. 1A-1B and FIG. 2 and form a group of circuits 33 so powered. An amplifier A1 receives a differential input voltage $V_{IN}$ and provides an output to a combiner 31 that shifts the common mode voltage of the output of amplifier A1 according to the selected position of a switch S2, which adds or subtracts a voltage offset of $V_S/4$, where $V_S$ is the power supply voltage $+V_{SUPP}$ provided at the input to power supply 32. Switch S2 is controlled by mode change control signal psctrl so that the common mode voltage shift at the input of delta-sigma ADC circuit 36 occurs at the same time as the change in power supply rails $V_{DD}$ and $V_{SS}$. The output of combiner 31 is thereby set to the mid-point of the voltage between common power supply rail $V_{DD}$ and corresponding common power supply return $V_{SS}$ of delta-sigma ADC circuit 36, so that the input integrator of delta-sigma ADC circuit 36 is operated at a suitable correct DC level. Other techniques, such as capacitively coupling the inputs or output(s) of amplifier A1, can alternatively be employed to maintain operation at a proper DC level. However, the depicted circuit can settle within a short period of time and does not require external capacitors or circuit area associated with internal capacitors. The above example is provided as an illustration of some measures that may need to be taken in an IC in accordance with an embodiment of the present invention with respect to analog signals.

Microcontroller core 38 receives the mode change output signal pschange and uses it to control ADC measurements so that an ADC measurement is re-started, corrected, discarded or otherwise managed when a mode change occurs due to the voltage across external storage capacitor $C_{EXT}$ crossing one of the thresholds. Alternatively, microcontroller core 38 could signal charge/discharge control to delay the assertion of mode change control signal psctl until a measurement has finished. The illustrated operation is provided as an example of how the mode change output signal pschange and mode change control signal psctl can be used to handle any housekeeping needed in association with a mode change event. Since it is generally expected that external storage capacitor $C_{EXT}$ can be sized so that mode changes occur on the order of several conversion cycles, ADC 30 can avoid any disruption due to the mode changes. In general, with respect to all of the embodiments disclosed herein, the present invention does not switch operating modes at a high rate, as in a typical capacitive voltage divider or doubler, but instead changes operating modes at as low of a rate as possible while meeting performance criteria and capacitor sizing limitations.

ADC integrated circuit 30 also includes input/output (I/O) drivers and receivers 37 that interface ADC 30 to external devices via, for example, a serial I/O interface SIO. Serial I/O interface SIO generally includes at least an input clock, and at least an output data signal. Since the DC levels of the digital outputs of microcontroller core 38 change with the selected operating mode, a level shifter 35 is included, which also receives the power supply rail ($V_{DD}$,$V_{SS}$) outputs from power supply 32 in order to provide the proper unshifting digital output levels to output drivers within I/O drivers and receivers 37. Since the input levels provided at the outputs of receivers within I/O drivers and receivers 37 will generally be valid over the full range of the power supply rail ($V_{DD}$,$V_{SS}$) outputs, no level shifting is generally required for those signals, although input protection such as resistors and diodes may be required at the digital inputs of microcontroller core 38 that are connected to I/O drivers and receivers 37. I/O drivers and receivers 37 may also or alternatively include high-performance analog circuits in which it is undesirable for the power supply voltages to shift, and therefore is operated from a fixed supply and is coupled to microcontroller core 38 in a manner similar to that illustrated for I/O drivers and receivers 37.

Figure 4:
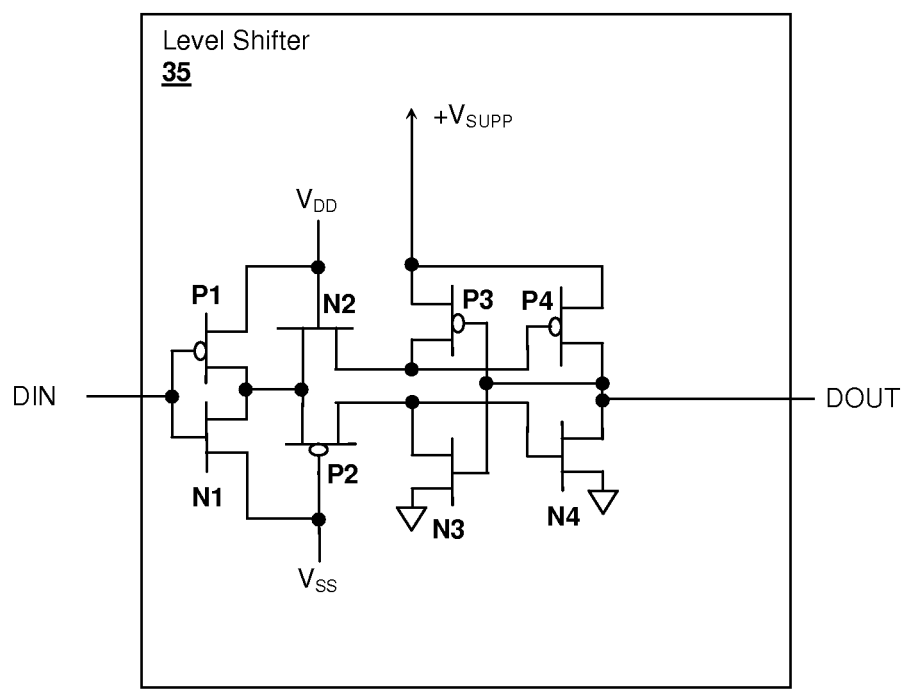
FIG. 4 is a schematic diagram depicting details of level shifter 35 of FIG. 3 in accordance with an embodiment of the present invention.

Referring now to FIG. 4, details of a level shifter circuit that can be used to implement level shifter 35 of FIG. 3 are shown in accordance with an embodiment of the present invention. Since in either of the above-described operating modes, one of the logic states will generate an output voltage of approximately $V+/2$ (logical low in the first operating mode and logical high in the second operating mode), a standard cross-coupled level shifter will conduct excessive current, lowering circuit efficiency, due to one of the inputs being held in a mid-level voltage state (with respect to the full power supply rails $+V_{SUPP}$ and 0). Therefore, a level shifter suitable for use in circuits according to the present invention is disclosed below. A digital input signal DIN is provided to an inverter formed by transistors P1 and N1, which has power supply rails provided as $V_{DD}$ and $V_{SS}$ and is therefore compatible with digital input signal DIN. The output of the inverter formed by transistors P1 and N1 are provided to two cross-coupled half-latches formed by transistors P3, P4 and transistors N3, N4, respectively. Transistors P4 and N4 provide digital output signal DOUT which has levels that extend from power supply $+V_{SUPP}$ to ground, since transistors P3 and P4 have drain terminals connected to power supply voltage $+V_{SUPP}$ and transistors N3 and N4 have source terminals connected to ground.

The half-latch formed by transistors P3 and P4 can only change the state of digital output signal DOUT from a low voltage state to a high voltage state, which happens when the common source connection of transistors P3 and P4 is pulled down to a voltage such that transistor P4 turns on long enough to turn off transistor P3. The half-latch formed by transistors N3 and N4 can only change the state of digital output signal DOUT from a high voltage state to a low voltage state, which happens when the common drain connection of transistors N3 and N4 is pulled up to a voltage such that transistor N4 turns on long enough to turn transistor N3 off. The inverter provided by transistors N1 and P1 is provided to generate the relatively high current required to change the states of the half-latches formed by transistors N3-N4 and P3-P4.

For each of the operating modes of ADC integrated circuit 30, there are two concerns: 1) the logic state provided at the input to the inverter formed by transistors N1 and P1 must set the correct state of digital output signal DOUT; and 2) the voltage level provided at the output of the inverter formed by transistors N1 and P1 must not cause any of the circuits in level shifter 35 to remain in a cross-conduction state or otherwise leak current after a state change has been accomplished. The first criteria need only set the half-latch formed by transistors P3 and P4 when the state of digital output signal DOUT is to be set to a logical high state, and similarly, the first criteria need only set the state of the half-latched formed by transistors N3 and N4 when the state of digital output signal DOUT is to be set to a logical low state. The second criteria is only of concern when digital input signal DIN is in a logic state and operating mode such that the voltage of digital input signal DIN is near the midpoint voltage of $+V_{SUPP}/2$, which occurs in the first operating mode for a logical low state and in the second operating mode for a logical high state.

The output of the inverter formed by transistors N1 and P1 is provided through transistor N2 to the input of the half-latch formed by transistors P3 and P4 and has a gate voltage set to power supply rail $V_{DD}$. The output of the inverter formed by transistors N1 and P1 is also provided through transistor P2 to the input of the half-latch formed by transistors N3 and N4 and has a gate voltage set to power supply return $V_{SS}$. In the first operating mode, when the digital input signal is in the logical high state, the output of the inverter formed by transistors P1 and N1 will be in the logical low state ($V_{SS}$), which is near the midpoint voltage of input power supply voltage $+V_{SUPP}$, since in the first operating mode $V_{SS} \approx +V_{SUPP}/2$. If digital output signal DOUT is already in a logical high state, then transistor P3 is off, transistor P4 is on and the gate of transistor P4 must just be maintained low enough that transistor P4 remains on. The voltage level $+V_{SUPP}/2$ as provided through transistor N2 will be sufficient to maintain transistor P4 in the on state. Transistor P2 is off, since power supply return $V_{SS} \approx +V_{SUPP}/2$ and transistor N3 is on, holding the source of transistor P2 at 0 Volts. If transistor P2 were not present, the output of the inverter formed by transistors N1 and P1 at $V_{SS} \approx +V_{SUPP}/2$ would turn the gate of transistor N4 on, causing an incorrect output state and cross-conduction from transistor P4.

If digital input signal DIN changes to a logical low state, then transistor P1 will turn on and transistor N1 will turn off, yielding a voltage of $\approx +V_{SUPP}$ at the drain terminals of transistors N2 and P2. Therefore, transistor N2 will turn off and transistor P2 will turn on, since the gate of transistor P2 is at $V_{SS} \approx +V_{SUPP}/2$ and the source of transistor P2 is at 0 Volts. The current provided through transistor P2 will turn on transistor N4, changing the state of transistor N3, P3 and P4 to change digital output signal DOUT to a logical low state.

Operation in the second operating mode is similar. When the digital input signal is in the logical high state, the output of the inverter formed by transistors P1 and N1 will be in the logical low state ($V_{SS}$), which is near ground (0 Volts). If digital output signal DOUT is already in a logical high state, then transistor P3 is off, transistor P4 is on and the gate of transistor P4 will be maintained low enough that transistor P4 remains on since the voltage at the drain of transistor N2 will be near ground and the gate of transistor N2 is at $V_{DD} \approx + V_{SUPP}/2$, keeping transistor N2 on. Transistor P2 is off, since power supply return $V_{SS} \approx 0$ and the drain of transistor P2 is also near ground. Transistor N3 is also on, holding the source of transistor P2 at 0 Volts.

If digital input signal DIN changes to a logical low state, then transistor P1 will turn on and transistor N1 will turn off, yielding a voltage of $\approx +V_{SUPP}/2$ at the drain terminals of transistors N2 and P2. Therefore, transistor N2 will turn off and transistor P2 will turn on, since the gate of transistor N2 is at $V_{DD} \approx +V_{SUPP}/2$ and the gate of transistor P2 is at 0 Volts. The current provided through transistor P2 will turn on transistor N4, changing the states of transistors N3, P3 and P4 to change digital output signal DOUT to a logical low state. If transistor N2 were not present, the output of the inverter formed by transistors N1 and P1 at $V_{SS} \approx +V_{SUPP}/2$ would turn the gate of transistor P4 on, causing an incorrect output state and cross-conduction from transistor N4. While the illustrated level shifter provides an implementation of level shifter 35 having a low static power consumption, other types of level shifters may be employed, such as differential amplifiers may be employed, with a consequent increase in static power consumption.

Figure 5:
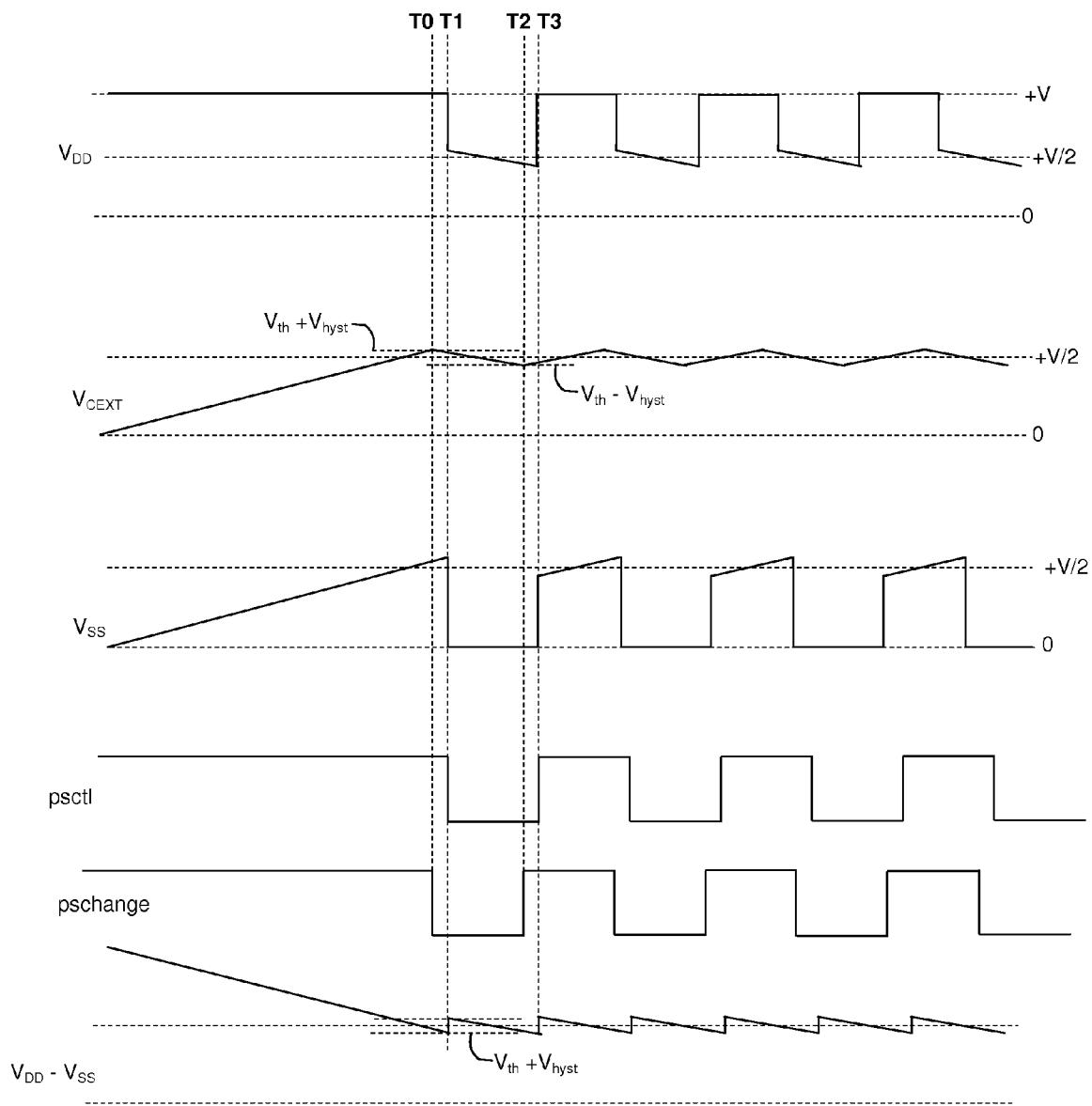
FIG. 5 is a signal waveform diagram depicting signal relationships within integrated circuit 20 of FIG. 2 and ADC integrated circuit 30 of FIG. 3.

Referring now to FIG. 5, a signal waveform diagram depicting signal relationships within integrated circuit 20 of FIG. 2 and ADC integrated circuit 30 of FIG. 3 is shown. As shown, initially power supply rail $V_{DD}$ is at a constant high voltage state and the voltage across external capacitor $V_{CEXT}$ rises, as does power supply return $V_{SS}$, which is coupled thereto. At time T0, voltage $V_{CEXT}$ exceeds threshold voltage $V_{th}+V_{hyst}$, causing mode change output signal pschange to change state, and after some delay, mode change control signal psctrl to also change state at time T1. The second operating mode begins, and power supply rail $V_{DD}$ now takes on the value of voltage $V_{CEXT}$, which begins to fall as capacitor $C_{EXT}$ is discharged. At time T2, voltage $V_{CEXT}$ drops below threshold voltage $V_{th}-V_{hyst}$, causing mode change output signal pschange to change state, and after some delay, mode change control signal psctrl to also change state at time T3, which switches operation back to the first operating mode and capacitor $C_{EXT}$ is charged again from the power supply return of the circuit group(s). The circuit continues to alternate between the first operating mode and the second operating mode, maintaining voltage $V_{CEXT}$ at an average value of $+V_{SUPP}/2$. The bottom waveform depicts the value of voltage $V_{DD}-V_{SS}$, which represents the actual voltage supplied to the circuit group across its power supply rails, which has a sawtooth shape since voltage $V_{DD}-V_{SS}$ is always $V_{th}+V_{hyst}$ at the beginning of each period of both operating modes and $V_{th}-V_{hyst}$ at the end of each period. In the illustrative embodiment, the value of voltage $V_{DD}-V_{SS}$ ramps from $+V_{SUPP}/2+V_{hyst}$ down to $+V_{SUPP}/2-V_{hyst}$ at twice the rate of the repletion of a full cycle of the operating modes.

Figure 6A:
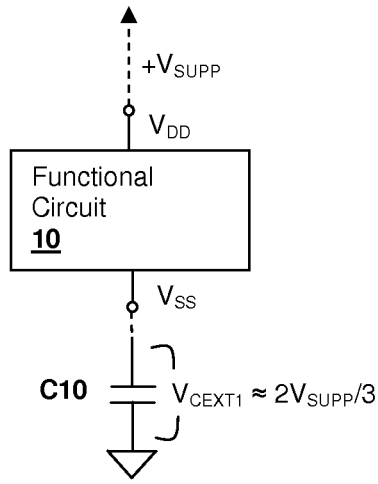
FIG. 6A, FIG. 6B and FIG. 6C are simplified schematic diagrams depicting modes of operation of an integrated circuit in accordance with another embodiment of the present invention.
Figure 6B:
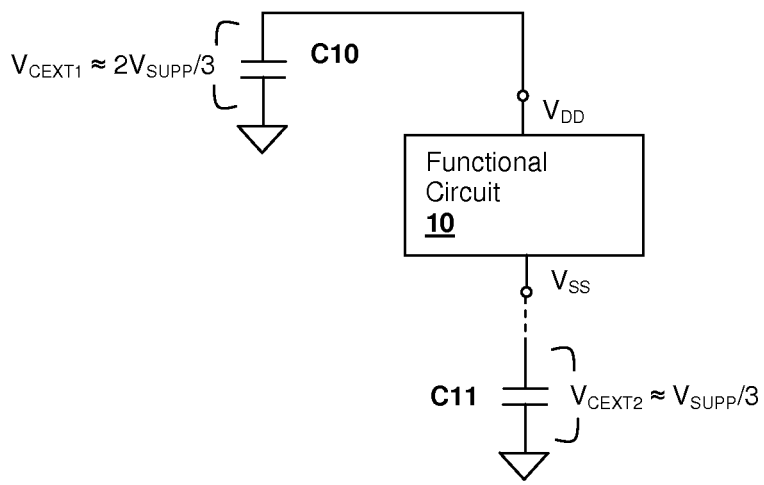
Figure 6C:
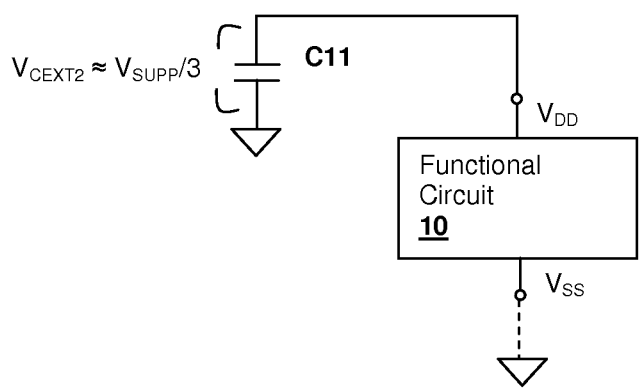

Referring now to FIG. 6A, FIG. 6B and FIG. 6C, operation of a circuit according to another embodiment of the invention is illustrated. FIGS. 6A-6C are similar to FIGS. 1A-1B, but an additional storage capacitor C11 is provided in addition to a storage capacitor C10, with the result that input power supply voltage is divided by three and there are three distinct operating modes of the circuit. In the first operating mode, as depicted in FIG. 6A, storage capacitor C10 is charged from the power supply return $V_{SS}$ of functional circuit 10, until a voltage $V_{CEXT1}$ across storage capacitor C10 reaches a threshold voltage level. Then, a second operating mode is selected, as illustrated by FIG. 6B. In the second operating mode, functional circuit 10 is powered from storage capacitor C10 and charges storage capacitor C11 from its power supply return $V_{SS}$ until a voltage $V_{CEXT2}$ voltage across capacitor C11 reaches another threshold voltage level (or voltage $V_{CEXT1}$ across capacitor C10 decreases below another threshold voltage level). Finally, in a third operating mode as illustrated in FIG. 6C, functional circuit 10 is powered from storage capacitor C11 until voltage $V_{CEXT2}$ decreases below a threshold, which causes the circuit to return to the first operating mode illustrated in FIG. 6A. The illustrated method produces an average of voltage $V_{CEXT1}$ substantially equal to $+V_{SUPP}*2/3$ and an average voltage voltage $V_{CEXT2}$ that is substantially equal to $+V_{SUPP}/3$. Additional capacitors and operating modes can be added to extend the scheme depicted in FIGS. 6A-6C to provide arbitrary voltage division by N, where N is the number of storage capacitors. It is noted that in the present embodiment, as well as others, that it is the operation of the control circuit that sets the average voltage on the storage capacitors and not the size or number of the capacitors themselves. However, as mentioned above, since placing the voltages at even divisions of the input power supply voltage also equalizes the range of deviation in each operating mode for a constant power supply current demand, it is desirable to do so.

Figure 7:
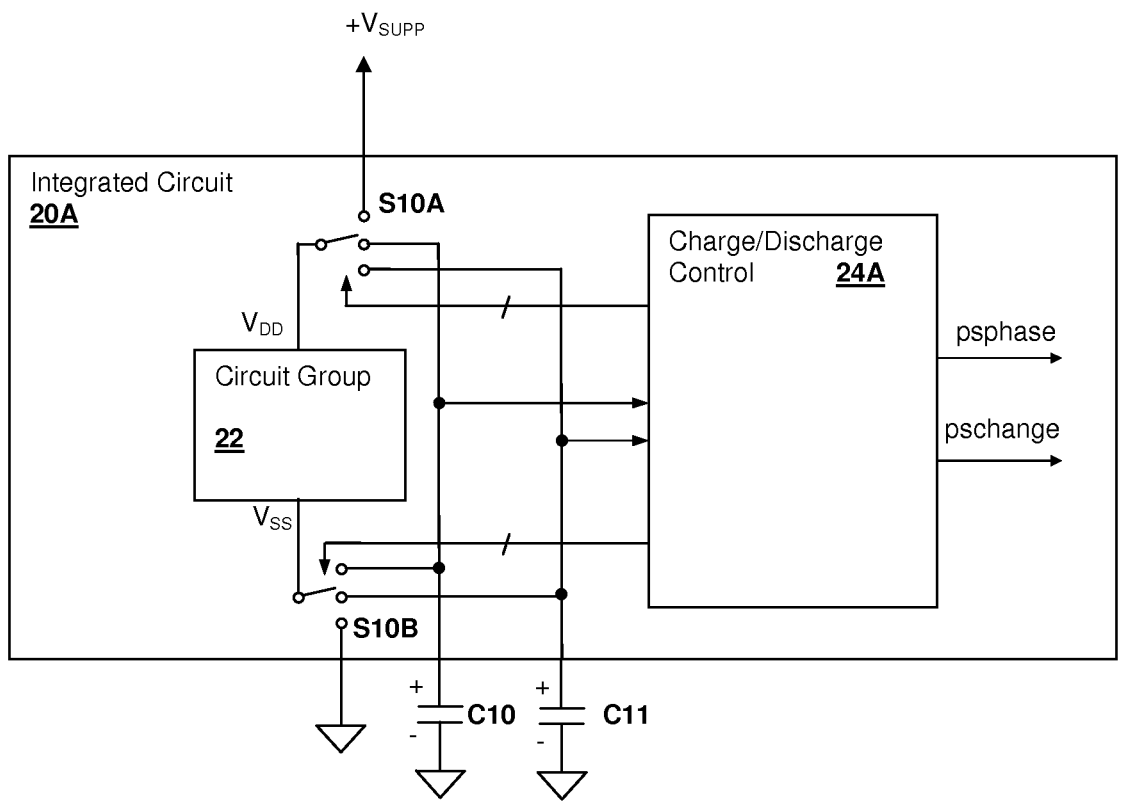
FIG. 7 is a block diagram depicting details of an integrated circuit 20A in accordance with the embodiment of the present invention illustrated in FIGS. 6A-6C.

Referring now to FIG. 7, an integrated circuit 20A in accordance with an embodiment of the invention as also illustrated by FIGS. 6A-6C is shown. Integrated circuit 20A is similar to integrated circuit 20 of FIG. 2, so only differences between them will be described below. Integrated circuit 20A includes a first storage capacitor terminal, to which storage capacitor C10 is connected, and a second storage capacitor terminal, to which storage capacitor C11 is connected. Switches S10A and S10B each have three positions, which are selected in conformity with control signals provided from a charge/discharge control circuit 24A to select the operating mode of integrated circuit 20A. The top position of switches S10A and S10B in FIG. 7 select the first operating mode in which storage capacitor C10 is charged through the power path of circuit group 22 from input power supply voltage $+V_{SUPP}$. In the second operating mode, storage capacitor C11 is charged through the power path of circuit group 22 from capacitor C10, which transfers charge to provide current to power circuit group 22. In the third operating mode, capacitor C11 is connected in parallel across power supply rail $V_{DD}$ and corresponding power supply return $V_{SS}$ to power functional circuit group 22. As mentioned above with reference to FIGS. 6A-6C, the configuration depicted in integrated circuit 20A is generally used to produce a power supply voltage across circuit group 22 which is one-third of input power supply voltage $+V_{SUPP}$, but additional terminals, storage capacitors and switch poles selectable for additional operating modes can be provided to extend the division to one-fourth of the power supply voltage or any other integer division needed by circuit group 22.

While the invention has been particularly shown and described with reference to the preferred embodiments thereof, it will be understood by those skilled in the art that the foregoing and other changes in form and details may be made therein without departing from the spirit and scope of the invention. Therefore, the present invention is understood to contemplate such variation from the disclosed embodiment.

What is claimed:

1. A method of powering a group of circuits within an integrated circuit, the method comprising:
    in a first operating mode for powering the group of circuits, charging a storage capacitor from a power supply return current of the group of circuits while the group of circuits is operated from a DC power supply by coupling the storage capacitor in series with the group of circuits and the DC power supply; and
    in a second operating mode for powering the group of circuits, powering the group of circuits from the storage capacitor by coupling power supply connections of the group of circuits to the storage capacitor.

2. The method of claim 1, further comprising:
    sensing when a voltage across the storage capacitor exceeds a first predetermined threshold;
    responsive to sensing that the voltage across the storage capacitor exceeds the first predetermined threshold, selecting the second operating mode;
    sensing when a voltage across the storage capacitor drops below a second predetermined threshold; and
    responsive to sensing that the voltage across the storage capacitor drops below the second predetermined threshold, selecting the first operating mode.

3. The method of claim 1, further comprising selecting between the first operating mode and the second operating mode so that an average voltage across the storage capacitor remains substantially equal to half of a voltage of the DC power supply.

4. The method of claim 1, wherein the storage capacitor is a first storage capacitor, and further comprising:
    in the second operating mode, charging a second storage capacitor from the power supply return current of the group of circuits while the group of circuits is operated from a voltage across the first storage capacitor; and
    in a third operating mode for powering the group of circuits, powering the group of circuits from the second storage capacitor.

5. The method of claim 1, wherein the group of circuits is a group of digital logic circuits, and further comprising shifting levels of an output of the group of digital circuits in response to voltages at a power supply input and a corresponding power supply return of the group of circuits as the voltages change dynamically in response to selection of the first operating mode and the second operating mode.

6. The method of claim 5, wherein the shifting levels is performed by selectively applying the output of the group of digital circuits through one or more pass devices having gates controlled by the power supply input and the corresponding power supply return of the group of circuits, respectively.

7. The method of claim 1, further comprising:
    in response to selection of the first operating mode, closing a first switch to couple a power supply input of the group of circuits to the DC power supply;
    in response to selection of the first operating mode, closing a second switch to couple the power supply return of the group of circuits to the storage capacitor;
    in response to selection of the second operating mode, opening the first switch and closing a third switch to couple the power supply input of the group of circuits to the storage capacitor; and
    in response to selection of the second operating mode, opening the second switch and closing a fourth switch to couple the power supply return of the group of circuits to a power supply return of the DC power supply.

8. The method of claim 7, further comprising in response to selection of the first operating mode, opening the third and fourth switches.

9. An integrated circuit, comprising:
a power supply input terminal;
a common return terminal;
a group of circuits having a pair of common power supply connections including a power supply input and a corresponding power supply return;
at least one storage capacitor terminal for connection of at least one corresponding capacitor for storing energy for periodic operation of the group of circuits; and
a switching circuit for coupling the power supply connections of the group of circuits in series between the power supply input terminal and the at least one storage capacitor terminal in a first operating mode, whereby the group of circuits is powered from the power supply input terminal, and for coupling the pair of power supply connections of the group of circuits between the at least one storage capacitor terminal and the common return terminal in a second operating mode, whereby the group of circuits is powered from the at least one storage capacitor terminal in the second operating mode.

10. The integrated circuit of claim 9, further comprising:
a sense circuit having an input coupled to the at least one storage capacitor terminal for sensing a voltage of the at least one storage capacitor terminal; and
a control circuit having an input coupled to an output of the sense circuit and an output coupled to the switching circuit for selecting between the first operating mode and the second operating mode, wherein the control circuit selects the first operating mode when a magnitude of a voltage between the at least one storage capacitor terminal and the common return terminal falls below a predetermined threshold and selects the second operating mode when the magnitude of the voltage between the at least one storage capacitor terminal and the common return terminal rises above another predetermined threshold.

11. The integrated circuit of claim 9, wherein the at least one storage capacitor terminal is a single storage capacitor terminal, and wherein a first average voltage of the at least one storage capacitor terminal with respect to the common return terminal is substantially equal to half of a second average voltage of the power supply input terminal with respect to the common return terminal.

12. The integrated circuit of claim 9, wherein the at least one storage capacitor terminal comprises multiple storage capacitor terminals, and wherein in a third operating mode, the group of circuits is energized from the multiple storage capacitor terminals by coupling the power supply input of the group of circuits to a first one of the multiple storage capacitor terminals and coupling the corresponding power supply return of the group of circuits to a second one of the multiple storage capacitor terminals.

13. The integrated circuit of claim 9, further comprising a flying capacitor coupled between the power supply input of the group of circuits and the corresponding power supply return of the group of circuits.

14. The integrated circuit of claim 9, wherein the group of circuits is a group of digital logic circuits, and wherein the integrated circuit further comprises a level shifter for coupling an output of the group of digital logic circuits to another circuit, wherein the level shifter comprises:
a level shifter circuit having a positive power supply input coupled to a positive power supply of the another circuit and a negative power supply input coupled to a negative power supply of the another circuit;
a first N-channel pass transistor having drain-source connections coupled between a first input of the level shifter circuit and the output of the group of digital logic circuits, and a gate coupled to the power supply input of the group of digital logic circuits; and
a second P-channel pass transistor having drain-source connections coupled between a second input of the level shifter circuit and the output of the digital logic block, and a gate coupled to the power supply return of the group of digital logic circuits, whereby the output of the digital logic block is selectively applied to one or more inputs of the level-shifter circuit according to the present operating mode of the integrated circuit and an instantaneous voltage level of the output of the digital logic block.

15. The integrated circuit of claim 14, wherein the level shifter circuit comprises:
a pull-up half latch formed by cross-coupled connection of a first pair of transistors and having an input coupled to one of the drain-source connections of the first N-channel pass transistor, wherein an input of the pull-up half latch provides the first input of the level shifter circuit; and
a pull-down half latch formed by cross-coupled connection of a second pair of transistors and having an input coupled to one of the drain-source connections of the second P-channel pass transistor, wherein an input of the pull-down half latch provides the second input of the level shifter circuit.

16. The integrated circuit of claim 9, wherein the switching circuit comprises:
a first switch for coupling the power supply input terminal to the power supply input of the group of circuits block in the first operating mode;
a second switch for coupling the at least one storage capacitor terminal to the power supply input of the group of circuits in the second operating mode;
a third switch for coupling the storage capacitor terminal to the corresponding power supply return of the group of circuits in the first operating mode; and
a fourth switch for coupling the common return terminal to the corresponding power supply return of the group of circuits in the second operating mode.

17. The integrated circuit of claim 9, wherein the group of circuits includes analog circuits.

18. The integrated circuit of claim 9, wherein the group of circuits includes a processor core, and wherein the control circuit provides a signal to the processor core to indicate selection between the first operating mode and the second operating mode.

19. A circuit, comprising:
a power supply input;
a common return corresponding to the power supply input;
a group of circuits having a pair of common power supply connections including a group power supply input and a corresponding group power supply return;
at least one storage capacitor for storing energy for periodic operation of the group of circuits; and
a switching circuit for coupling the common power supply connections of the group of circuits in series between the power supply input and the at least one storage capacitor in a first operating mode, whereby the group of circuits is powered from the power supply input, and for coupling the pair of power supply connections of the group of circuits between the at least one storage capacitor and the common return in a second operating mode, whereby the group of circuits is powered from the at least one storage capacitor in the second operating mode.

20. The circuit of claim 19, further comprising:

a sense circuit having an input coupled to the at least one storage capacitor for sensing a voltage of the at least one storage capacitor; and a control circuit having an input coupled to an output of the sense circuit and an output coupled to the switching circuit for selecting between the first operating mode and the second operating mode, wherein the control circuit selects the first operating mode when a magnitude of a voltage between the at least one storage capacitor and the common return falls below a predetermined threshold and selects the second operating mode when the magnitude of the voltage between the at least one storage capacitor and the common return rises above another predetermined threshold.

21. The circuit of claim 19, wherein the at least one storage capacitor comprises multiple storage capacitors, and wherein in a third operating mode, the group of circuits is energized from multiple storage capacitors by coupling the power supply input of the group of circuits to a first one of the multiple storage capacitors and coupling the corresponding power supply return of the group of circuits to a second one of the multiple storage capacitors.

* * * * *